US009134714B2

(12) United States Patent
Hoffknecht et al.

(10) Patent No.: US 9,134,714 B2
(45) Date of Patent: Sep. 15, 2015

(54) SYSTEMS AND METHODS FOR DISPLAY OF CONTROLS AND RELATED DATA WITHIN A STRUCTURE

(75) Inventors: Marc Hoffknecht, NewMarket (CA); Stefan Warner, Markham (CA); Deane VanLuven, Whitby (CA)

(73) Assignee: OSRAM SYLVANIA Inc., Danvers, MA (US)

( * ) Notice: Subject to any disclaimer, the term of this patent is extended or adjusted under 35 U.S.C. 154(b) by 952 days.

(21) Appl. No.: 13/108,757

(22) Filed: May 16, 2011

(65) Prior Publication Data

US 2012/0293527 A1 Nov. 22, 2012

(51) Int. Cl.
*G09G 5/02* (2006.01)
*G05B 15/02* (2006.01)
*G06T 19/00* (2011.01)
*H04L 29/08* (2006.01)
*G06F 3/048* (2013.01)
*G06T 15/50* (2011.01)
*G06T 19/20* (2011.01)
*H04L 12/28* (2006.01)

(52) U.S. Cl.
CPC ............... *G05B 15/02* (2013.01); *G06F 3/048* (2013.01); *G06T 15/503* (2013.01); *G06T 19/00* (2013.01); *G06T 19/20* (2013.01); *H04L 12/2803* (2013.01); *H04L 67/025* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 4,407,447 A | 10/1983 | Sayegh | |
| 5,059,871 A | 10/1991 | Pearlman et al. | |
| 5,572,438 A | 11/1996 | Ehlers et al. | |
| 5,682,949 A | 11/1997 | Ratcliffe et al. | |
| 5,701,058 A | 12/1997 | Roth | |
| 5,703,442 A | 12/1997 | Notohamiprodjo et al. | |
| 5,812,422 A | 9/1998 | Lyons | |
| 5,962,989 A | 10/1999 | Baker | |
| 6,118,230 A | 9/2000 | Fleischmann | |
| 6,181,086 B1 | 1/2001 | Katyl et al. | |
| 6,208,905 B1 | 3/2001 | Giddings et al. | |
| 6,359,564 B1 | 3/2002 | Thacker | |
| 6,388,396 B1 | 5/2002 | Katyl et al. | |
| 6,388,399 B1 | 5/2002 | Eckel et al. | |
| 6,505,186 B1 | 1/2003 | Muro et al. | |
| 6,583,573 B2 | 6/2003 | Bierman | |
| 6,792,319 B1 | 9/2004 | Bilger | |
| 7,116,341 B2 | 10/2006 | Ohto | |
| 2002/0047628 A1 | 4/2002 | Morgan et al. | |

(Continued)

OTHER PUBLICATIONS

Fan et al.; "An Approach to Data Visualization and Interpretation for Sensor Networks;" IEEE; Proceedings of the 37th Hawaii International Conference on System Sciences—2004; Jan. 2004.*

(Continued)

*Primary Examiner* — Edward Martello
(74) *Attorney, Agent, or Firm* — Shaun P. Montana

(57) ABSTRACT

The system helps facility managers and other users to efficiently navigate through a building or complex of buildings, and quickly gather information for (and control) individual building systems or groups of systems. A method includes displaying an image representing at least a portion of a building; and displaying a gradient indicator representing a parameter associated with a zone of the building, wherein the gradient indicator is displayed with the image in accordance with the zone for the parameter.

21 Claims, 15 Drawing Sheets

(56) References Cited

U.S. PATENT DOCUMENTS

| | | | |
|---|---|---|---|
| 2003/0050737 | A1 | 3/2003 | Osann, Jr. |
| 2003/0233214 | A1 | 12/2003 | Kreichauf |
| 2005/0122064 | A1 | 6/2005 | Chevalier et al. |
| 2005/0252984 | A1 | 11/2005 | Ahmed |
| 2008/0062167 | A1 | 3/2008 | Boggs et al. |
| 2008/0198159 | A1 | 8/2008 | Liu et al. |
| 2011/0279452 | A1 | 11/2011 | Ibe et al. |

OTHER PUBLICATIONS

R.C. Evans, G. Koppelman, V.T. Rajan; "Shaping geometric objects by cumulative translational sweeps;" IBM J. Res. Develop. vol. 31, No. 3 May 1987; pp. 343-360.*

Vijay Srinivasan, Lee R. Nackman; "Voronoi diagram for multiply-connected polygonal domains I: Algorithm;" IBM J. Res. Develop. Vol. 31, No. 3 May 1987; pp. 361-372.*

Siavash N. Meshkat, Constantine M. Sakkas; "Voronoi diagram for multiply-connected polygonal domains II: Implementation and application;" IBM J. Res. Develop. vol. 31, No. 3 May 1987; pp. 373-381.*

USPTO; Office Action dated Mar. 2, 2006 in U.S. Appl. No. 10/425,631.

USPTO; Office Action dated Dec. 6, 2005 in U.S. Appl. No. 10/425,631.

USPTO; Final Office Action dated Nov. 7, 2006 in U.S. Appl. No. 10/425,631.

USPTO; Office Action dated Feb. 27, 2007 in U.S. Appl. No. 11/514,145.

EPO; Examination Report dated Jun. 20, 2008 in EPO Application No. 2003737777.7.

PCT; International Search Report dated Aug. 21, 2003 in PCT Application No. PCT/CA/2003/000922.

PCT; Written Opinion dated Aug. 2, 2004 in PCT Application No. PCT/CA/2003/000922.

PCT; International Preliminary Examination Report dated Sep. 20, 2004 in PCT Application No. PCT/CA/2003/000922.

"DALI Command MultiDim Intelligent Lighting Control System," Philips Dali Command MultiDim, Apr. 2002, pp. 1 to 11.

Reda Elhakim et al., Interactive 3D Visualization for Wireless Sensor Networks, The Visual Computer: International Journal of Computer Graphics, Apr. 17, 2010, pp. 1071-1077, vol. 26 No. 6-8, Springer, Berlin, Germany.

Fengxian Fan et al., An Approach to Data Visualization and Interpretation for Sensor Networks, Proceedings of the 37th Annual Hawaii International Conference on System Sciences—2004, Jan. 5, 2004, pp. 1-9, IEEE, Piscataway, New Jersey.

Heemin Park et al., Design and Implementation of a Wireless Sensor Network for Intelligent Light Control, 6th International Symposium on Information Processing in Sensor Networks—2007, Apr. 1, 2007, pp. 370-379, IEEE, Piscataway, New Jersey.

J. Gauthier, International Search Report and Written Opinion of the International Searching Authority, Sep. 12, 2012, pp. 1-12, European Patent Office, Rijswijk, The Netherlands.

* cited by examiner

SYSTEMS AND METHODS FOR DISPLAY OF CONTROLS AND RELATED DATA WITHIN A STRUCTURE

FIELD

The disclosure generally relates to systems and methods for building control.

BACKGROUND

Many buildings include complex systems to provide heating, cooling, lighting, security and other services. These systems may require a significant amount of energy, which can present a significant challenge to facility managers facing rising (and volatile) energy prices, as well as requirements to be more environmentally sensitive. These challenges can be particularly acute for large commercial buildings where manual control over many disparate systems is often time-consuming, burdensome, and expensive.

These and other issues are addressed by embodiments of the present disclosure. Among other things, embodiments of the disclosure can reduce energy costs and help control and manage building systems more efficiently and effectively compared to conventional systems or methods for building control.

BRIEF SUMMARY

Among other things, embodiments help facility managers and other users to efficiently navigate through a building or complex of buildings, and quickly gather information for (and control) individual building systems or groups of systems.

A method according to various embodiments includes displaying, by a computer-based system via a user interface, an image representing at least a portion of a building; and displaying, by the computer-based system via the user interface, a gradient indicator representing a parameter associated with a zone of the building, wherein the gradient indicator is displayed with the image in accordance with the zone for the parameter.

A system according to various embodiments includes a processor, a user interface coupled to the processor, and a memory coupled to the processor and storing instruction for: displaying, via the user interface, an image representing at least a portion of a building; and displaying, via the user interface, a gradient indicator representing a parameter associated with a zone of the building, wherein the gradient indicator is displayed with the image in accordance with the zone for the parameter.

A computer-readable medium according to various embodiments comprises instructions for: displaying, by a computer-based system via a user interface, an image representing at least a portion of a building; and displaying, by the computer-based system via the user interface, a gradient indicator representing a parameter associated with a zone of the building, wherein the gradient indicator is displayed with the image in accordance with the zone for the parameter.

It is to be understood that both the foregoing general description and the following detailed description are exemplary and explanatory only and are not restrictive of the disclosure, as claimed.

BRIEF DESCRIPTION OF THE DRAWINGS

A more complete understanding of the embodiments of the present disclosure may be derived by referring to the detailed description and claims when considered in connection with the following illustrative figures.

DETAILED DESCRIPTION

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles. The disclosure may be implemented as a method, system or in a computer readable medium.

Three Dimensional Display

Figure 1:
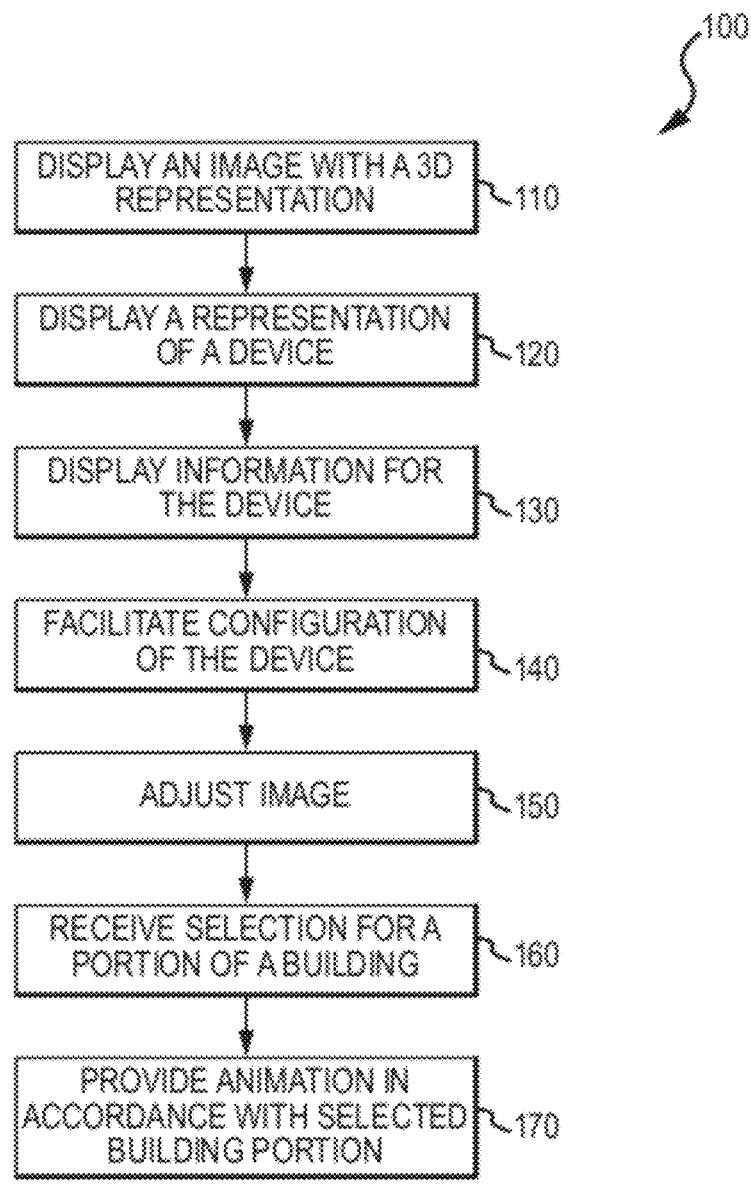
FIG. 1 illustrates an exemplary method according to various embodiments.

FIG. 1 illustrates an exemplary method for building control and management that provides three-dimensional views of a building or complex according to an embodiment. This method, as well as the other methods described herein, may be performed by one or more computer-based systems (i.e., any system that includes, or operates in conjunction with, a computer system), such as the exemplary computer-based system depicted in FIG. 10 and described in more detail below. All, or a portion, of the steps in method 100 may be performed in any suitable order.

The exemplary method 100 includes displaying, (e.g., via a user-interface including a display screen), an image representing at least a portion of a building, where at least part of the image is a three-dimensional representation (110). The method 100 further includes displaying a representation of a device via the user interface (120), displaying information for the device (130), and facilitating the configuration of the device (140). Method 100 also includes adjusting the configuration of the image (150), receiving a selection of a portion of the represented building (160), and providing an animation in accordance with the selection of the building portion (170).

Figure 2:
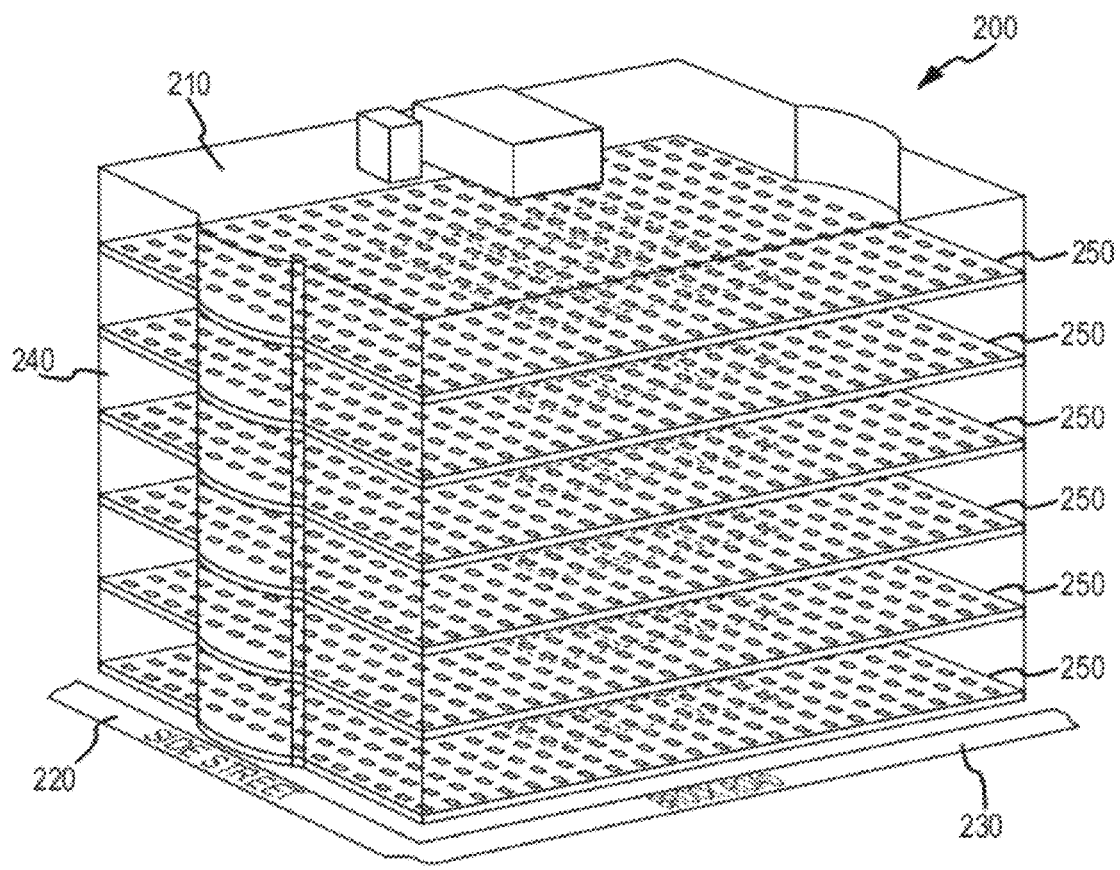
FIGS. 2 and 3 are exemplary three-dimensional representations of buildings in accordance with various embodiments.
Figure 3:
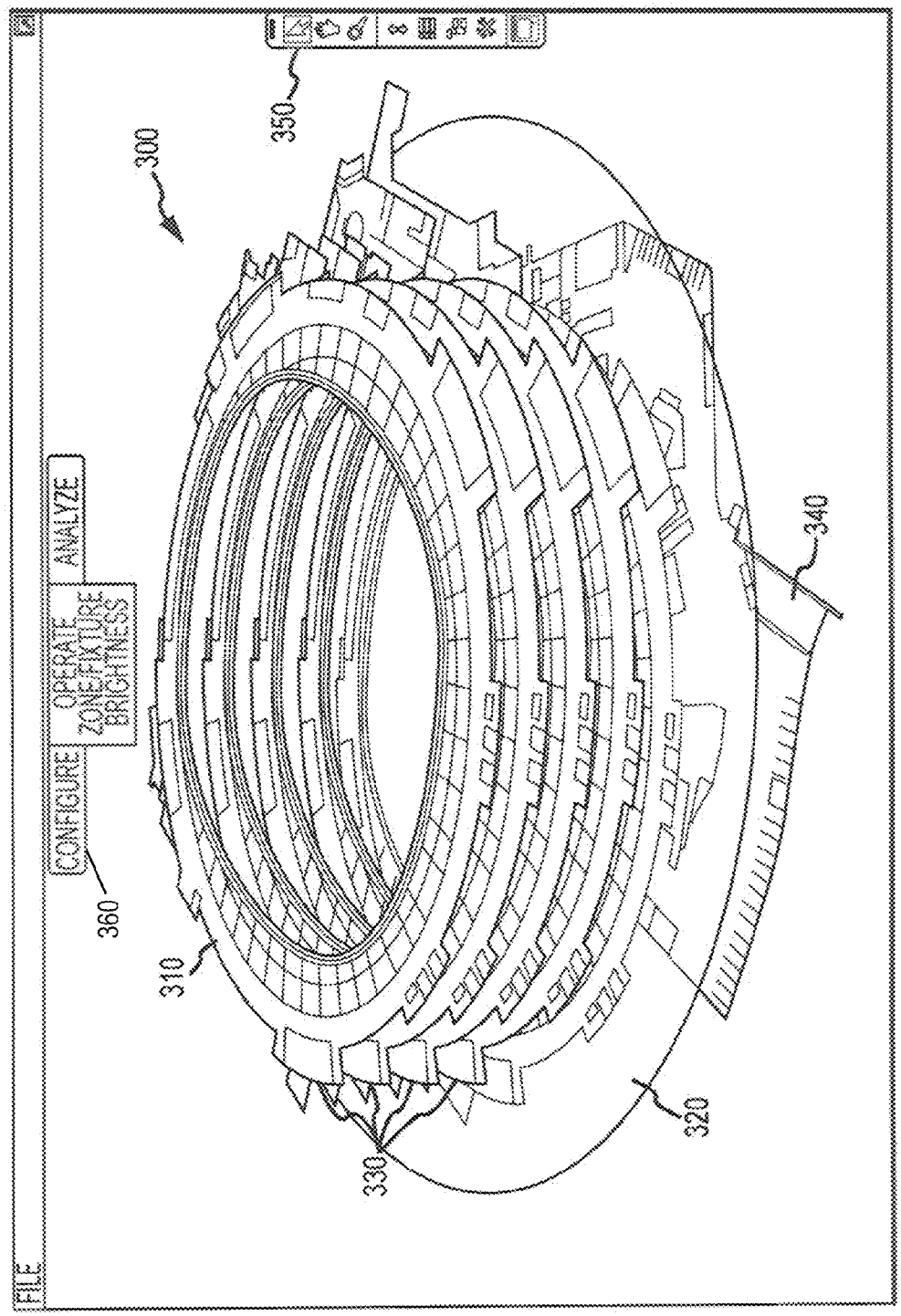

FIGS. 2 and 3 illustrate exemplary three-dimensional representations of buildings that may be displayed (110) in accordance with embodiments. Any desired portion of a structure (or group of structures) may be displayed in accordance with embodiments. Additionally, representations of any desired geographical features, landmarks, or other objects may be displayed in conjunction with the representation of the building(s). The image 200 in FIG. 2, for example, includes a three-dimensional representation of an office building 210, as well as representations of streets 220 and 230 external to the building.

Portions of the image may be colored, shaded, transparent, opaque, or include any other desired characteristic in order to convey information to a user. In FIG. 200, for example, the representation of building 210 includes a semi-transparent exterior 240, allowing representations of the floors 250 within the building 210 to be seen. The image 300 in FIG. 3 includes a three-dimensional representation of a coliseum 310. In this embodiment, a semi-transparent ground layer representation 320 helps distinguish between levels at or above ground level (330) and levels below ground level (340).

Figure 3A:
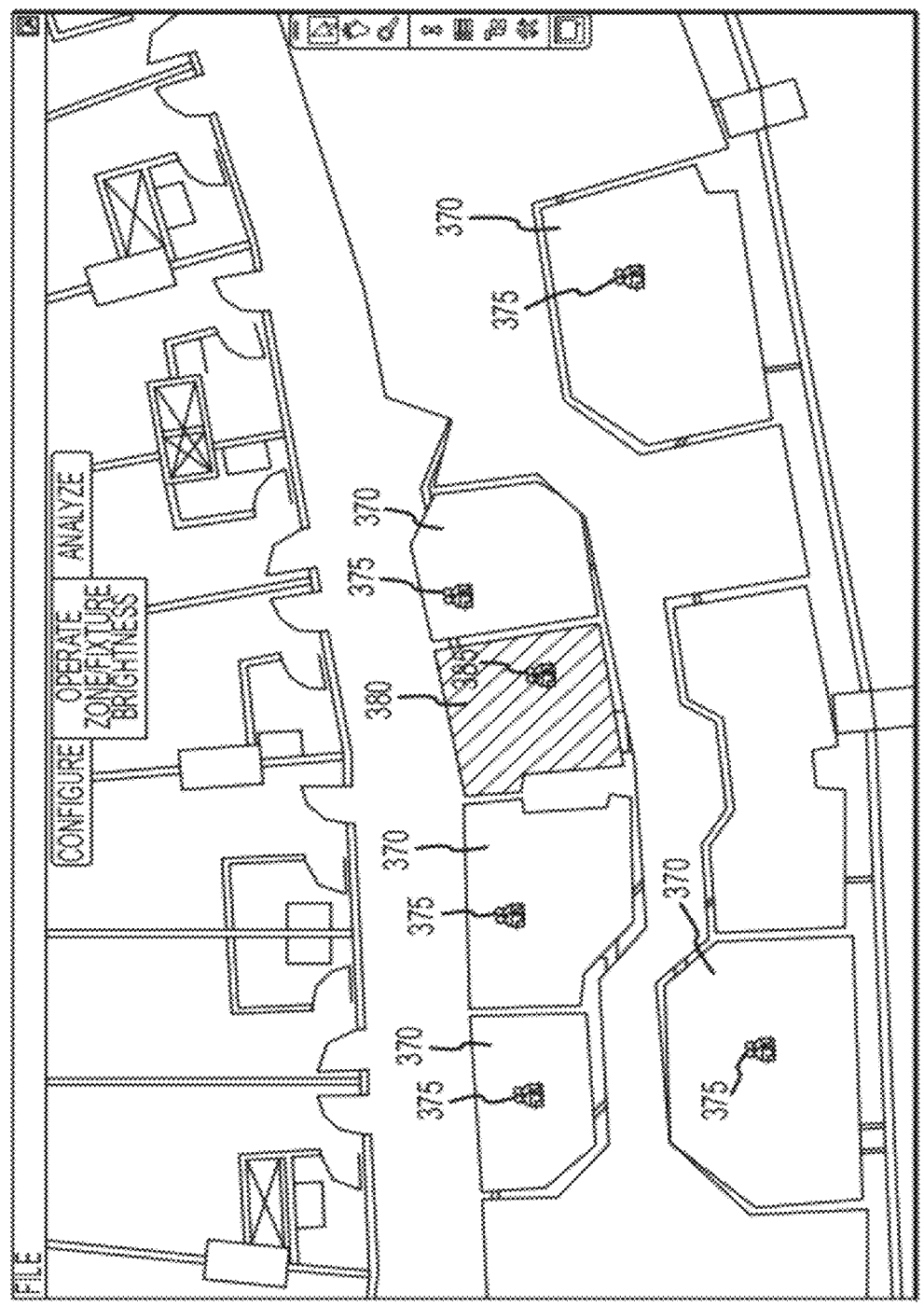
FIG. 3A is an exemplary two-dimensional view of a portion of the building represented in FIG. 3.

While FIGS. 2 and 3 display entire structures, any desired portion of a building may be displayed in accordance with embodiments. Additionally, embodiments may alternately display buildings (or portions thereof) in two-dimensional or three-dimensional representations, or a combination of the two. Among other things, embodiments provide a user with the flexibility to quickly and easily navigate through a building to gather information and/or control various systems and other features of the building. FIG. 3A, for example, depicts a two-dimensional view of a portion of the coliseum 310 shown in FIG. 3. In one embodiment, the image in FIG. 3A can be displayed in response to a user selecting the portion of the coliseum 310 via the user interface (160).

An image displayed in accordance with embodiments may include any desired features of a building, such as interior and exterior walls, cubicles, offices, light fixtures, HVAC ventilation systems, plumbing, doorways, stairways, furniture, repair equipment, and any other static or dynamic object or feature. For example, the image in FIG. 3A includes representations of features such as walls, hallways, and offices 370, and displays a representation of a device 375 (a lighting control device in this example) (120) in each respective office 370. The shading in the representation of office 380 signifies that it has been selected by a user (e.g., by using a control device of a user interface), which can allow the user to gather information on the office 380, update status information for the office 380, or perform any other desired operation. The representation of device 385 may likewise be selected by a user in order to, for example, display information for the device (130) and/or to configure the device 385 (140). The user may select a representation of a device or portion of a building in any suitable manner, including by using a control device of the user interface (such as a mouse or keyboard) to click, highlight, and/or hover over the desired representation.

Figure 7:
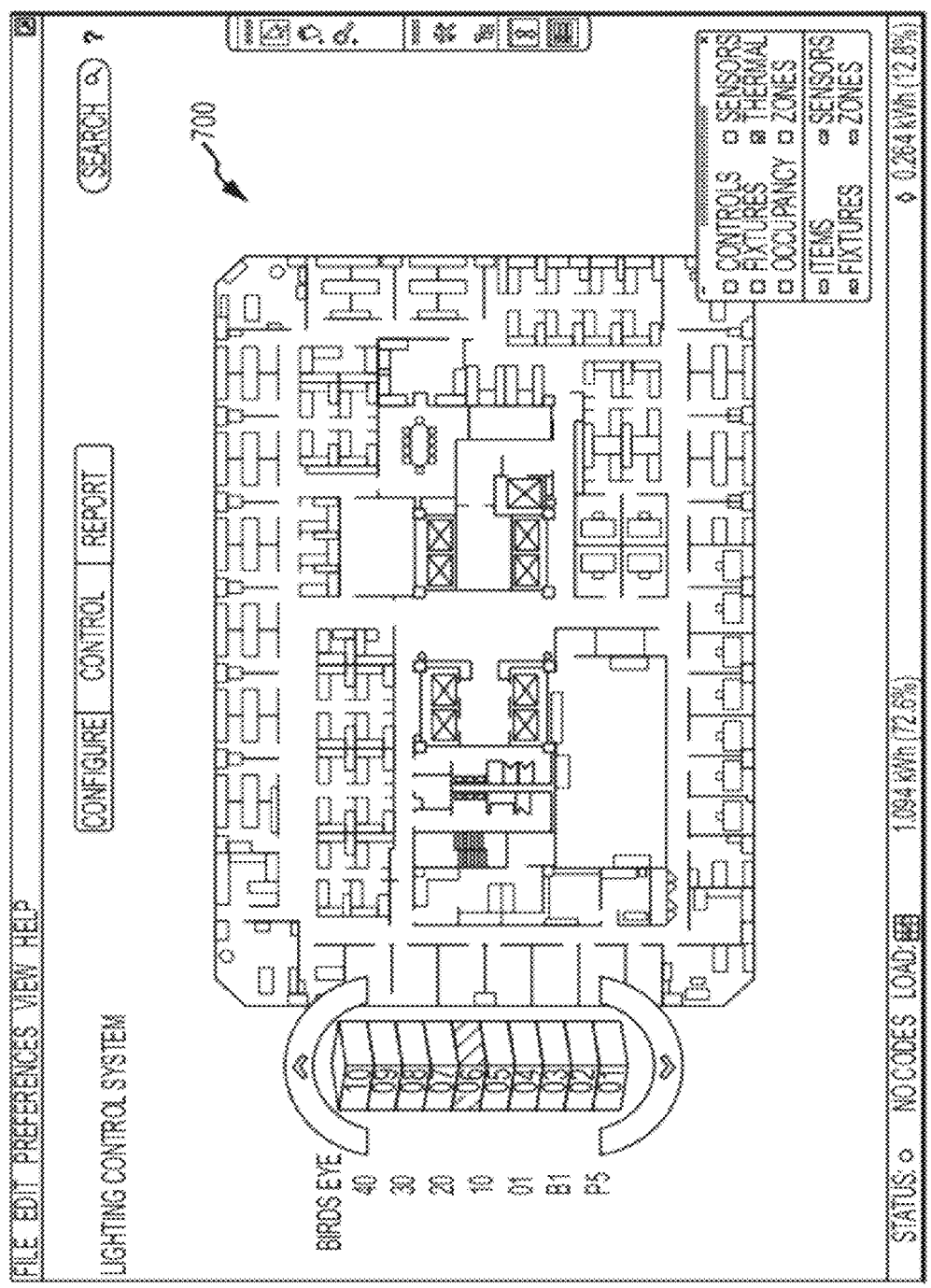
FIG. 7 is an exemplary two-dimensional representation of a building floor in accordance with various embodiments.

The user may also control various features and functionality of the device through the user interface according to embodiments. In one exemplary embodiment, a user may select the representation of lighting device 385 in order to turn the lights on or off in office 380, or to set a timer to turn the lights in office 380 on or off at a predetermined time. In another exemplary embodiment, a user can alternately hide or show a feature, group of features, or class of features via the user interface. Among other things, this allows a user to select the level of detail he/she wishes to view in the image, as well as to reduce unwanted clutter in an image. FIG. 7 illustrates an exemplary two-dimensional image of a floor selected by a user. In this example, image 700 includes a menu control 710 to allow a user to display or hide various features on the floor, as well as to configure devices for the floor, such as sensors.

Embodiments can display information about any desired devices, systems, or portions of a building (130). For example, embodiments may be used to display information regarding parameters such as a lighting status; a lighting level; a load shedding status; a lighting power density; a lighting power consumption; an occupancy status; a comparative energy trend; a temperature level; a humidity level; a coverage range of a sensor; and/or a carbon dioxide level. Information on such parameters may be displayed in any desired format. In one embodiment, described in more detail below, information regarding parameters is graphically displayed using gradient indicators. In one embodiment, parameters may be associated with a device and/or a zone of the building. Information (such as a parameter) related to a device can be displayed in response to a selection of a representation of the device by a user. Device information may be presented in any other suitable manner. In one embodiment, for example, information for a device is displayed, and periodically updated next to the representation of the device in the display image to allow a user to quickly see the status of a group of devices.

Embodiments may allow a user to configure (140) or perform other functions using a representation of a device in any suitable manner. For example, image 300 includes buttons 350 for configuring, operating, and analyzing various devices and groups of devices in the coliseum. Embodiments may also allow a user to perform diagnostics on any desired system in a building.

Method 100 allows a user to adjust the properties of an image (150). In FIG. 3, for example, menu bar 360 allows a user to configure the image 300, as well as to select portions thereof (160). In one embodiment, the menu bar 360 allows a user to alternate between two-dimensional and three-dimensional representations, tilt the image, rotate the image, and to increase or decrease the scale of the image. In one embodiment, a user can add, delete, and manipulate the elements in an image, such as to alter the shape of a lighting zone, add or remove a cubicle or internal wall, add labeling to portions of the image, and/or perform any other desired modifications to the image. In another embodiment, elements in an image can be altered or updated automatically in response to an event.

For example, if an occupant of a building turns on lights in the building, the image can be automatically updated to show which lights are on and/or the areas or zones illuminated by the active lights (see, e.g., the display of gradient indicators below).

Embodiments may allow a user to define zones of interest within the image. Such zones may be of any size, shape, and volume. A zone may be any volume inside, outside, or associated with the building in any way. Zones may be defined according to boundaries (such as internal walls of the building), in accordance with one or more devices (such as the zone of illumination of a lighting device), and/or arbitrarily defined according to a desired criteria (such as a zone that includes the offices of the human resources department on the floor of a building).

Embodiments can display information for a building in a manner that is not only efficient and effective, but visually pleasing to users. In one exemplary embodiment, referring now to FIG. 4, a plurality of floors (410, 420, 430, and 440) are displayed in image 400. As shown, floors 410, 420, 430, and 440 each have vanishing points in their x-axis and y-axis, but no vanishing point in their z-axis. Instead, the floors 410, 420, 430, and 440 are arranged in a stack by offsetting the y-coordinate of adjacent floors (i.e., floor 410 appears further towards the rear of the image 400 than floor 420). Among other things, by not diminishing the size of floors due to a z-axis vanishing point, multiple floors of a building (and information associated therewith) can be displayed in full, which provides more information in a visually pleasing manner to a user. Additionally, the vertical (z-axis) spacing between floor representations 410, 420, 430, and 440 is larger than the spacing between the floors of the actual building. Furthermore, the front boundary line of each floor 410, 420, 430, 440 is of substantially equal thickness to the rear boundary line of the floor. Among other things, each of these features helps a user view each floor and its respective detail in its entirety.

Figure 4:
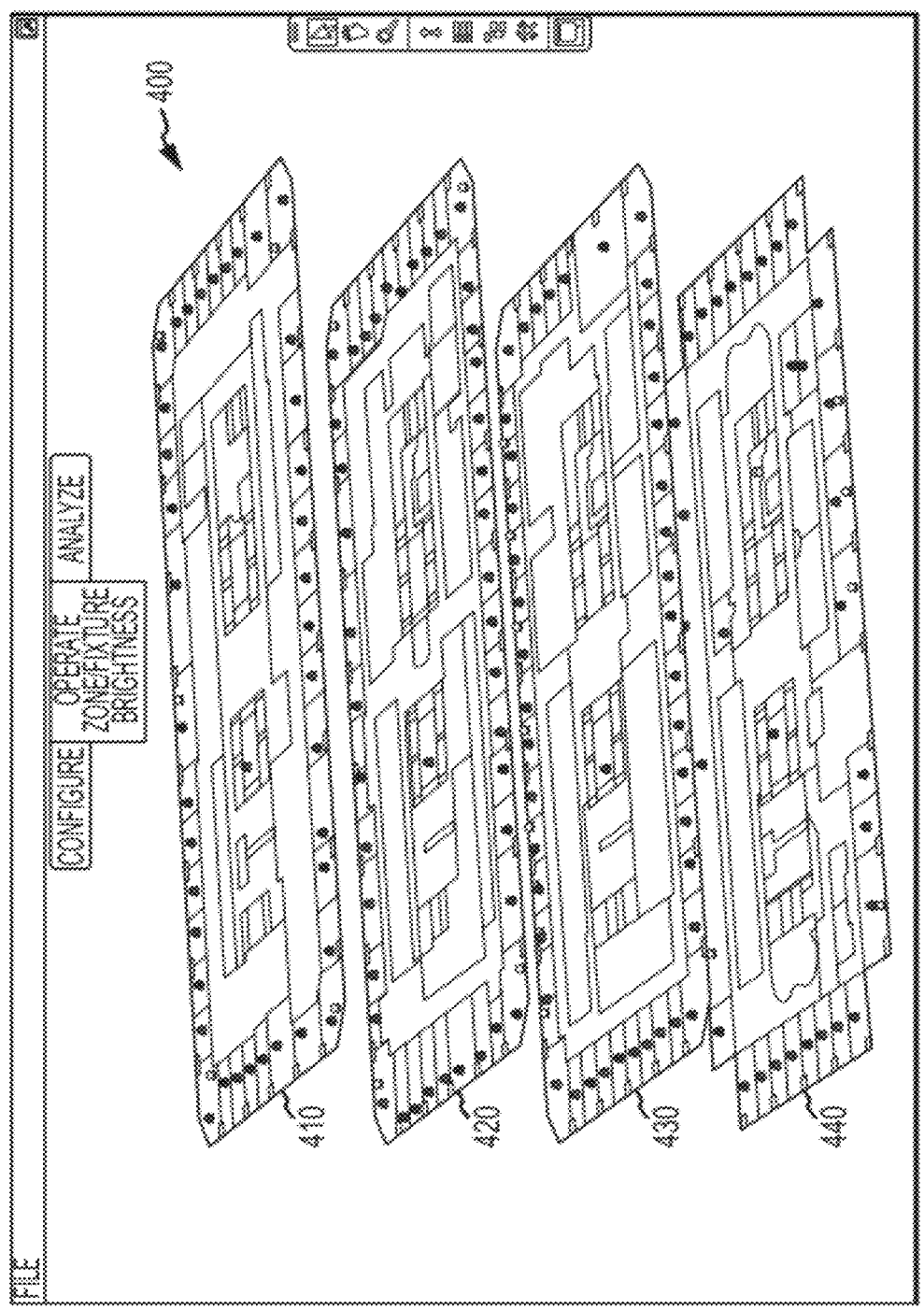
FIGS. 4 and 5 illustrate exemplary three-dimensional representations of the floors within a building in accordance with various embodiments.

While each floor in FIG. 4 is depicted in a flat plane, alternate embodiments may (with additional z-axis layering) depict some or all of the elements of a three-dimensional representation using a vanishing point in the z-axis. For example, it is possible to depict the position of sun shades on a building by showing them "upright" as rectangles. In one embodiment, complex z-ordering can be (at least partially) avoided by determining the distance between the element and the viewpoint of the user, and by drawing distant elements first.

Figure 5:
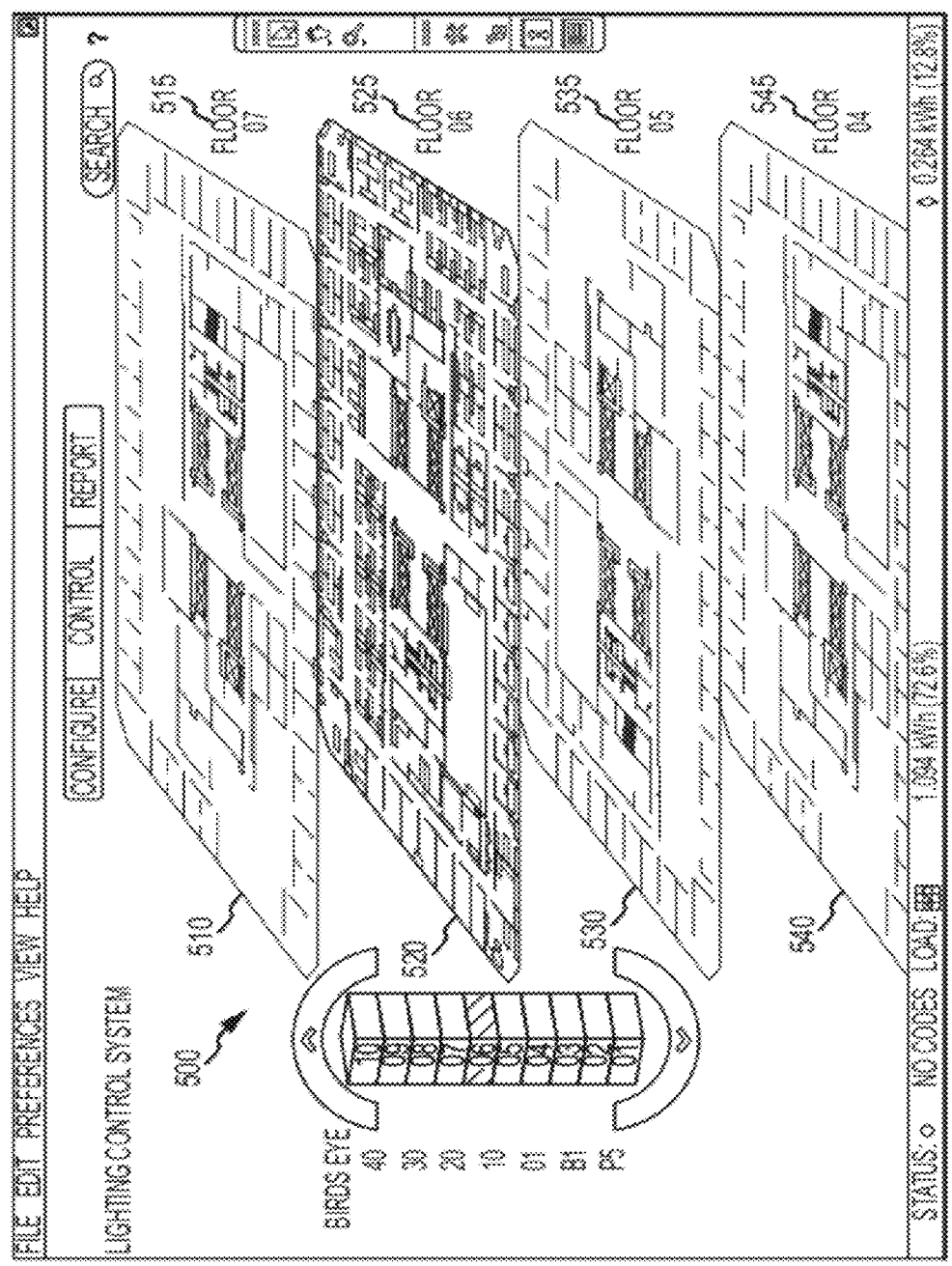

An animation may be presented in response to the selection of a portion of a building (170). In one embodiment, referring now to FIG. 5, image 500 includes representations of four floors (510, 520, 530, and 540). An indicator identifying the floors is displayed next to each floor (515, 525, 535, and 545, respectively). A user may select any of floors 510, 520, 530 or 540, or use the floor selection control 550 to quickly display floors in other parts of the building. In one embodiment, where the user is working on floor 540 and selects floor 520, an animation is presented to drop floor 540 to the bottom of the displayed floors (as shown in FIG. 5) and present floor 520 in the middle of the image 500. In this embodiment, the image is presented at a lower level of detail as the floors are moving during the animation, and presents the image at a higher level of detail once the animation is complete and the floors are stationary in the image. Similar animations may be performed when tilting, rotating, panning, and zooming the image. Where the image is generated in layers (as described below), selected layers of the image may be presented at a higher or lower level of detail during animation. Additionally, as shown in FIG. 5, non-selected portions of a building (such as floors 510 and 540) may be shown in lower-levels of detail from the selected portion(s) (i.e., floor 520 in FIG. 5). Among other things, this reduces the amount of graphical rendering required by a computer system displaying the image, and allows a user to quickly identify the selected floor or other selected portion of a building.

Embodiments may generate and display a three-dimensional representation of a building, building feature, or portions thereof in any suitable manner. In one exemplary embodiment, displaying a three-dimensional representation of a building feature includes identifying a visible feature of the building to display in the three-dimensional representation, and identifying an invisible feature of the building to omit from the three-dimensional representation. Determining visible and invisible features may be performed in any suitable manner, such as by analyzing a feature along its z-axis, identifying a class to which the feature belongs to (e.g., a wall, furniture, a stairwell), and/or analyzing the feature's position relative to other nearby features. Visible features can be displayed in the three-dimensional representation in layers, each layer corresponding to a class of features for the building. For example, the boundary of a building floor may correspond to one layer, while walls and furniture correspond to another layer. A more detailed exemplary method for generating a three-dimensional representation is described below.

Exemplary Generation of a 3D Image

The following description illustrates one possible method for generating a three-dimensional representation. In this embodiment, generation of the three-dimensional representation includes an analysis of the area to be viewed, the scale of the image, and the rotation and translation of the image. Additionally, a floor plan (such as reflected ceiling plan or CAD drawing) for the portion of the building being rendered is analyzed and parsed into tiles of a predetermined size (e.g., 25'×25'). Among other things, the division of the image into tiles helps improve performance of a computer system displaying the image by, as described more below, determining in advance if the tile or portions thereof are even visible. Calculations for invisible tiles and portions thereof can thus be avoided.

Features within each tile (which may be any visible object such as walls, doors, furniture, stairways, and other objects) are sorted to determine features that will be invisible. Features may be omitted according to any desired criteria. For example, a furniture layer may be omitted from calculations and from drawing onto the screen if performance would suffer. The floor's outline and structural wall, however, may be assigned a higher priority and they may therefore still be drawn. Among other things, this exemplary approach helps balance detail on the screen with performance demands, as well as with aesthetics.

A transformation matrix may be calculated by analyzing the scale, rotation and translation of the image. In this exemplary embodiment, for example, for an image displaying multiple floors of a building, a determination is made as to whether the floor, (or portions thereof) are visible and if so, which tiles of the floor are visible. A determination is made as to where on the display screen of a user interface the three-dimensional points of the floor would be projected. This determination is performed by setting the z-axis coordinate for the floor to zero, applying a transformation matrix, projecting the coordinate into the two-dimensional coordinates of the user interface display screen, and adjusting the y-axis screen coordinates of the point up or down (i.e., parallel shifting the coordinates on the screen) by adding an offset proportional the floor's z-coordinate. In this embodiment, the z-coordinate is removed from each point, thereby positioning the user's viewpoint at the same relative coordinate for each floor, and shifting the resulting floor parallel to the y-axis. This approach removes the vanishing point in the z-axis, which, as described above, helps users to see the full detail of multiple floors.

In this exemplary embodiment, the potentially visible area of a floor is analyzed. If the analysis indicates that no portion of the potentially visible area is actually visible, no further processing for the floor is performed. Otherwise, the visible area of the floor is subdivided (e.g., the rectangle created by the corner points of the floor is subdivided into four quadrants) and a determination is made as to whether any portion of each quadrant is visible. The visible area is repeatedly subdivided in like fashion until it is known which tiles of the floor are visible, yielding a list of full or partially visible tiles for the floor.

The three-dimensional representation of the floor is generated in layers. In this exemplary embodiment, the layers (from bottom to top) include: shadowing of the floor cast onto the floor below (if applicable); a semi-transparent representation of ground level (if applicable); an outline of the floor (e.g., a white backdrop); walls and furniture; Interactive items (e.g., luminaries, zones, sensors, and other objects a user may interface with or define through the user interface); and colorization, (e.g., a gradient indicator as described in more detail below. In this manner, multiple visible features of a building (such as floors, stairwells, offices, walls, furniture, and other objects) can be efficiently generated using multiple layers.

In order to draw the elements of a layer, the three-dimensional points are transformed into two-dimensional display screen coordinates as described above. Points that fall outside the visible screen area may be clipped by the graphics card of the computer system displaying the image. The two-dimensional display screen coordinates are calculated for each line segment which allows lines in the background of the image to be drawn with substantially the same thickness as lines in the foreground of the image, which helps improve the clarity of the image.

Multiple floors in the image can be drawn from the bottom floor to the top floor, allowing each floor to be (to the extent possible) visible in its entirety to allow a user to immediately view the floor and information associated therewith. Among other things, this approach helps reduce or even eliminate the need for complex z-ordering (that is, determining which graphical element is hidden behind another element—and which portion is visible).

Gradient Indicator Display

In accordance with embodiments, building information may be represented in images using gradient indicators. An indicator may include one or more colors, one or more shades of color(s), one or more patterns, and/or any other visual indicia capable of display using a gradient range.

Figure 6A:
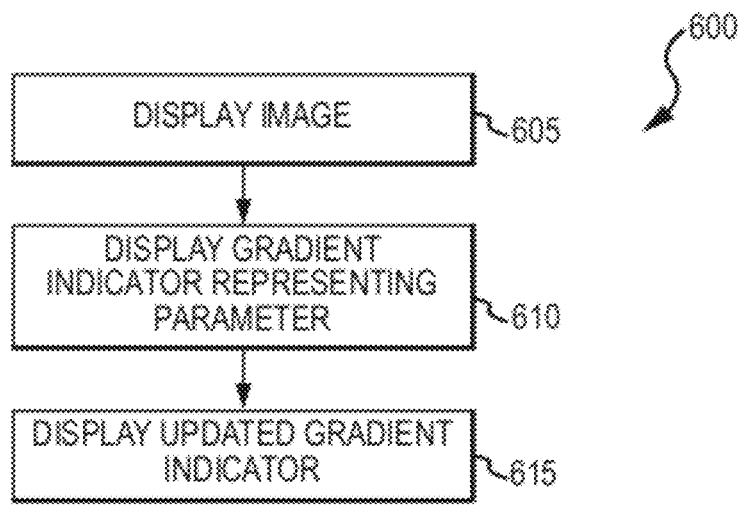
FIGS. 6A and 6B illustrate exemplary methods according to various embodiments.

In accordance with one embodiment, method 600 depicted in FIG. 6A includes displaying via a user interface, an image representing at least a portion of a building (605) and displaying via the user interface, a gradient indicator representing a parameter associated with a zone of the building, wherein the gradient indicator is displayed with the image in accordance with the zone for the parameter (610). Method 600 further includes displaying updated gradient indicator (615) (e.g., in response to a change in the parameter represented by the indicator). The displayed image may include an entire building (e.g., as depicted in FIGS. 2 and 3) or portions of a building (e.g., as depicted in FIGS. 5 and 7). Additionally, gradient indicators may be displayed in conjunction with images including two-dimensional representations, three-dimensional representations, or combinations of the two. In cases where a gradient indicator is being displayed in conjunction with a three-dimensional representation of a building or portion thereof, the expanded polygons may likewise be transformed from a two-dimensional representation to a three-dimensional representation. In one embodiment, the transformation of gradient indicators includes projecting three dimensional coordinates into two dimensional coordinates on the display screen using matrix calculations taking into account the appropriate rotation, translation and scaling for the gradient indicators.

A gradient indicator may be used to represent any desired parameter, including a lighting status; a lighting level; a load shedding status; a lighting power density; a lighting power consumption; an occupancy status; a comparative energy trend; a temperature level; a humidity level; a coverage range of a sensor; and/or a carbon dioxide level. Indicators may be selected automatically by, for example, a computer-based system displaying the image. Indicators may also be selected and configured by a user through a user interface in communication with a computer-based system displaying the image. For example, a user may select a type of indicator used to represent a parameter (such as a particular color or range colors), how smoothly or sharply the gradient indicators blend together, and/or the number of intermediate indicators (such as colors) to display in the gradient.

Parameters represented by the gradient indicator may be associated with one or more devices and/or with one or more zones in the building. As described previously, zones may be of any size, shape, and volume, and may be defined according to any desired criteria. Among other things, use of gradient indicators helps graphically convey information to users quickly and efficiently, which can be of particular value for a facilities manager overseeing a large building with many complex systems. In one embodiment, a computer-based system (such as the system depicted in FIG. 10) communicates with the devices and systems in a building to determine parameter values, then generates gradient indicators and displays them on an image representative of the building (or portions thereof) via a display screen of a user interface.

Figure 6B:
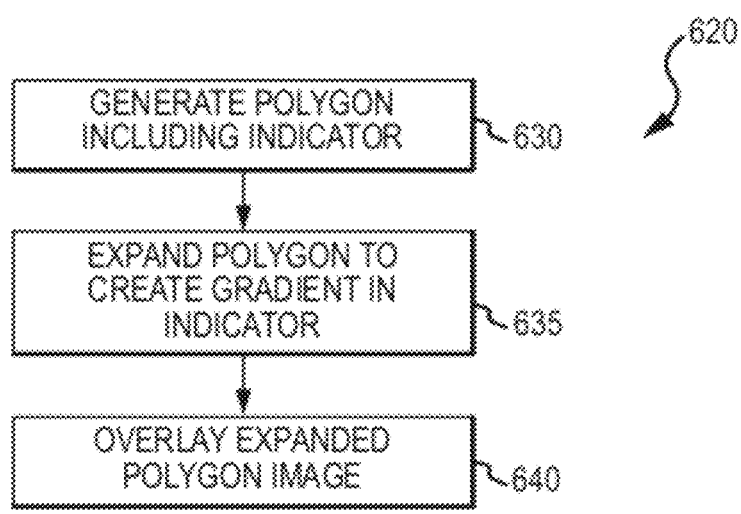

FIG. 6B illustrates an exemplary method 620 for generating and displaying a gradient indicator. Method 620 includes generating a polygon based on the parameter, where the polygon includes an indicator (630), expanding the polygon and creating a gradient in the indicator (635), and overlaying the expanded polygon on the image in accordance with the respective zone(s) for the parameter (640).

The polygon may be any size, shape, and configuration, and may generated (630) in any suitable manner. The polygon may include any type of indicator, such as a color, shade, and/or pattern. The indicator may be selected for the polygon based on any suitable criteria, such as a value of the parameter. In one embodiment, for example, an indicator comprising a green color may be selected to represent a relatively low room temperature, while an indicator comprising a red color may be selected to represent a relatively high room temperature. Data for the parameter may be collected in any suitable manner. In one embodiment, one or more devices associated with the parameter may provide asynchronously provide the data to a computer-based system generating the gradient indicator. Alternately, the computer-based device may poll the one or more devices for the data.

The polygon may be generated based on one or more boundaries associated with the building. Boundaries may be physical (as in the case of walls and doors) or selected based on any desired criteria (e.g., a boundary between an area occupied by an engineering department and a human resource department or a zone arbitrarily selected for the parameter). Embodiments may generate a plurality of gradient indicators that represent a respective plurality of parameters and display the indicators with an image in accordance with the respective zone(s) for the parameters. In some embodiments, a gradient indicator may be associated with multiple zones, multiple gradient indicators may be associated with a single parameter, and/or multiple gradient indicators may be associated with the same zone. Additionally, zones may overlap each other.

Figure 8A:
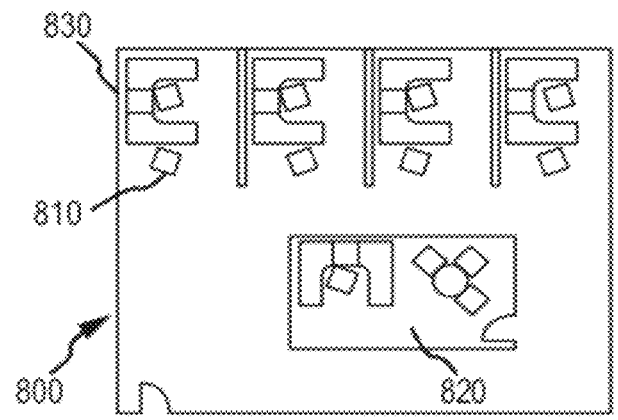
FIGS. 8A-8M illustrate the generation of exemplary gradient indicators in accordance with various embodiments.
Figure 8B:
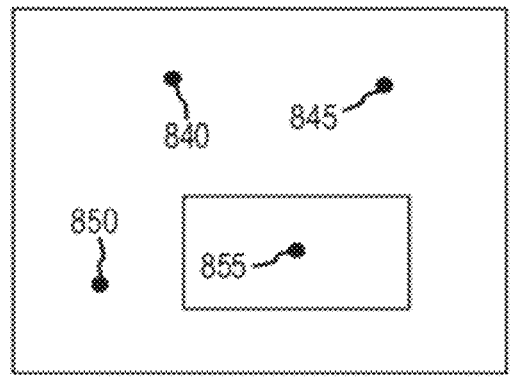
Figure 8C:
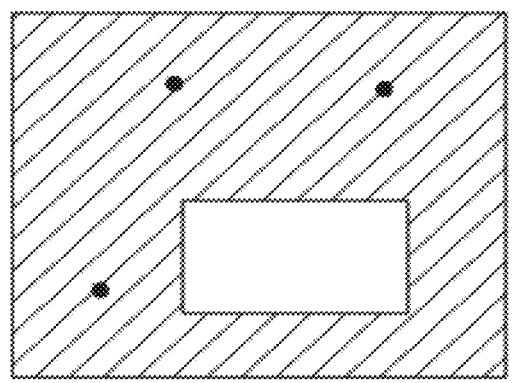
Figure 8D:
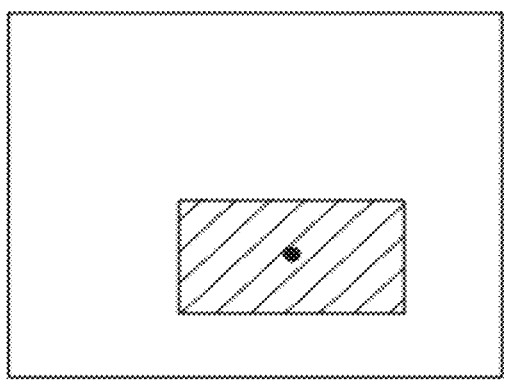

FIGS. 8A-8M illustrate the generation of a plurality of gradient indicators. FIG. 8A illustrates an exemplary office space 800. The office space 800 includes an open cubicle area 810 with four cubicles and an enclosed office 820. The enclosed office 820 is bounded by its walls, while the open cubicle area 810 is bounded by its outer wall 830, as well as by the walls of the enclosed office 820. FIG. 8B illustrates data sources for four parameters (HVAC vents providing temperature readings, in this example) associated with zones within office space 800. Three of the data sources (840, 845, and 850) are located in the open cubicle area 810, while a fourth data source (855) is located within the enclosed office 820. FIG. 8C illustrates the open cubicle area 810 with its boundary (the outer wall 830 and a cutout for the interior office 820). FIG. 8D illustrates the boundary for the interior office 820 (formed by the walls of the office 820).

Figure 8E:
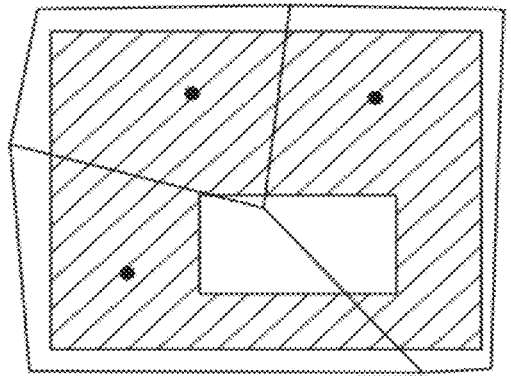
Figure 8F:
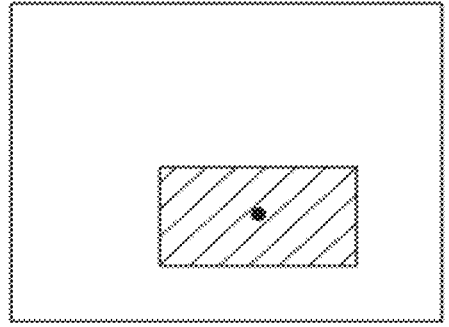

The polygons may be generated by performing a tessellation for each separate bounded volume. In one embodiment, a form of tessellation known as a "Voronoi tessellation" is used, whereby each bounded volume is divided into a discrete set of polygons, with every point in a given polygon closer to its data source than any data source of any other polygon. Any other suitable form of tessellation may be used in conjunction with embodiments. FIGS. 8E and 8F illustrate the Voronoi tessellations for the open cubicle area 810 and enclosed office 820, respectively.

A Voronoi tessellation treats the data sources as "points" in space (i.e., without considering the actual physical dimensions of the data source). In many cases, it is acceptable to use the center of a data source for its respective point in space for Voronoi tessellation. However, in cases where a physically large data source (such as an HVAC system) is close to a physically small data source (such as a light source), using the center point of the data source may lead to the polygon generated for the smaller data source to occupy space already occupied by the larger data source. To avoid this, the large data source may be divided into multiple points to generate multiple polygons for the large data source, which may be used to generate a plurality of gradient indicators associated with a single parameter, or recombined before creation of the gradients.

Figure 8G:
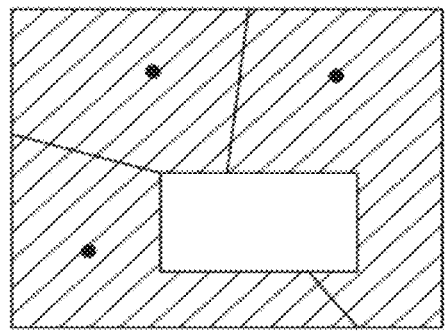
Figure 8H:
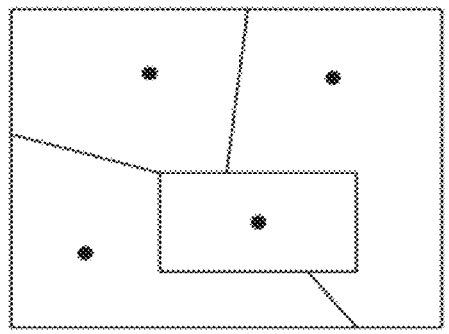

In one embodiment, the polygons generated by tessellation may be clipped based on the outer perimeter of a boundary. As shown in FIG. 8E, for example, the polygons generated by Voronoi tessellation for the open cubicle area 810 extend beyond the outer wall 830. FIG. 8G shows the polygons of FIG. 8E after being clipped to correspond to the boundaries of the outer wall 830 and walls of the enclosed office 820. Likewise, the polygon generated by the Voronoi tessellation of the enclosed office 820 may be clipped to correspond to the boundaries of the interior office walls. Among other things, clipping the polygons at boundaries presents a more accurate representation of their respective parameters (e.g., light from a light source will not appear to "bleed" through a solid wall). FIG. 8H shows the recombination of the clipped open cubicle area 810 with the clipped interior office 810

The size and/or shape of a polygon may be modified to exclude a portion of a zone associated with the parameter. This may be performed for parameters such as light from a light source blocked by a boundary, for parameters associated with a device with a limited effective range, such as a motion sensor, or in other circumstances. Modification of a polygon to exclude, for example, an area where no sensor coverage is available because of physical limitations (e.g., a solid wall between sensor and the area) helps generate a more realistic area for the data source.

Figure 8K:
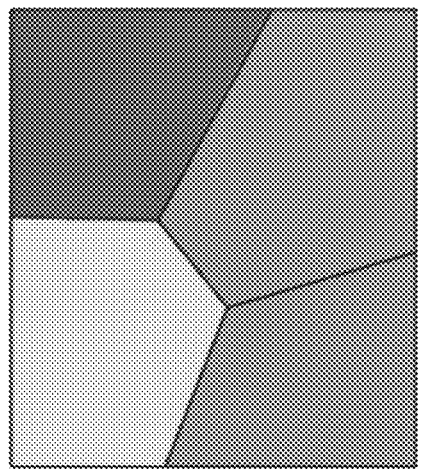
Figure 8J:
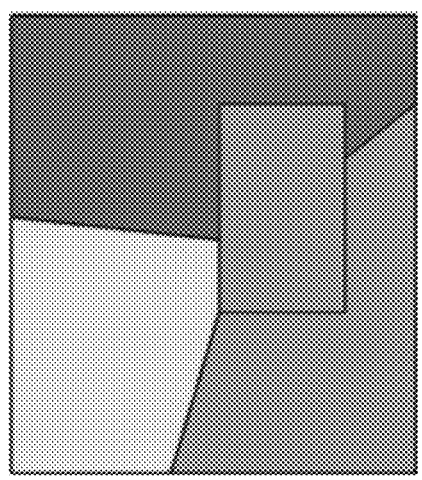
Figure 8I:
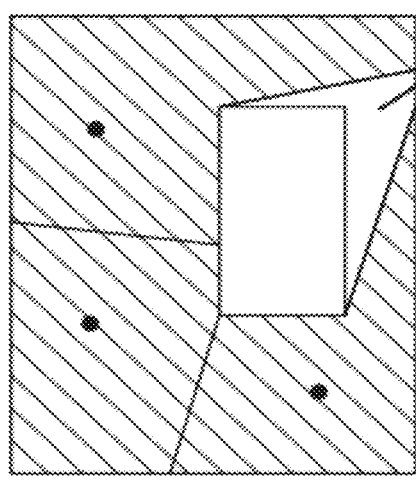

FIG. 8I illustrates an example of such modification, whereby the polygons in FIG. 8G are modified to account for a determined "dead zone" 860 that is not associated with any of the data sources 840, 845, 850, or 855. This modification could be used when generating the gradient indicators, but for sake of simplicity in FIGS. 8J-8M, the dead zone 860 is not taken into account when generating the gradient indicators.

Figure 8L:
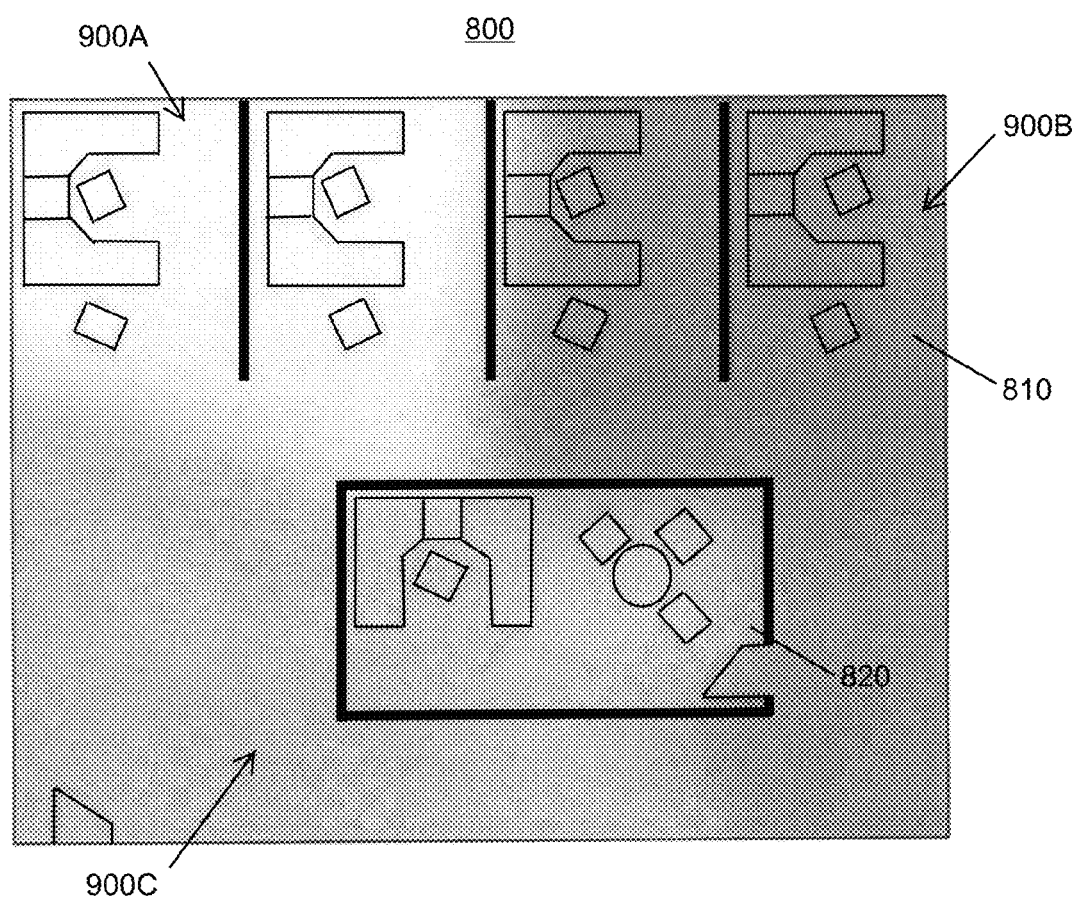
Figure 8M:
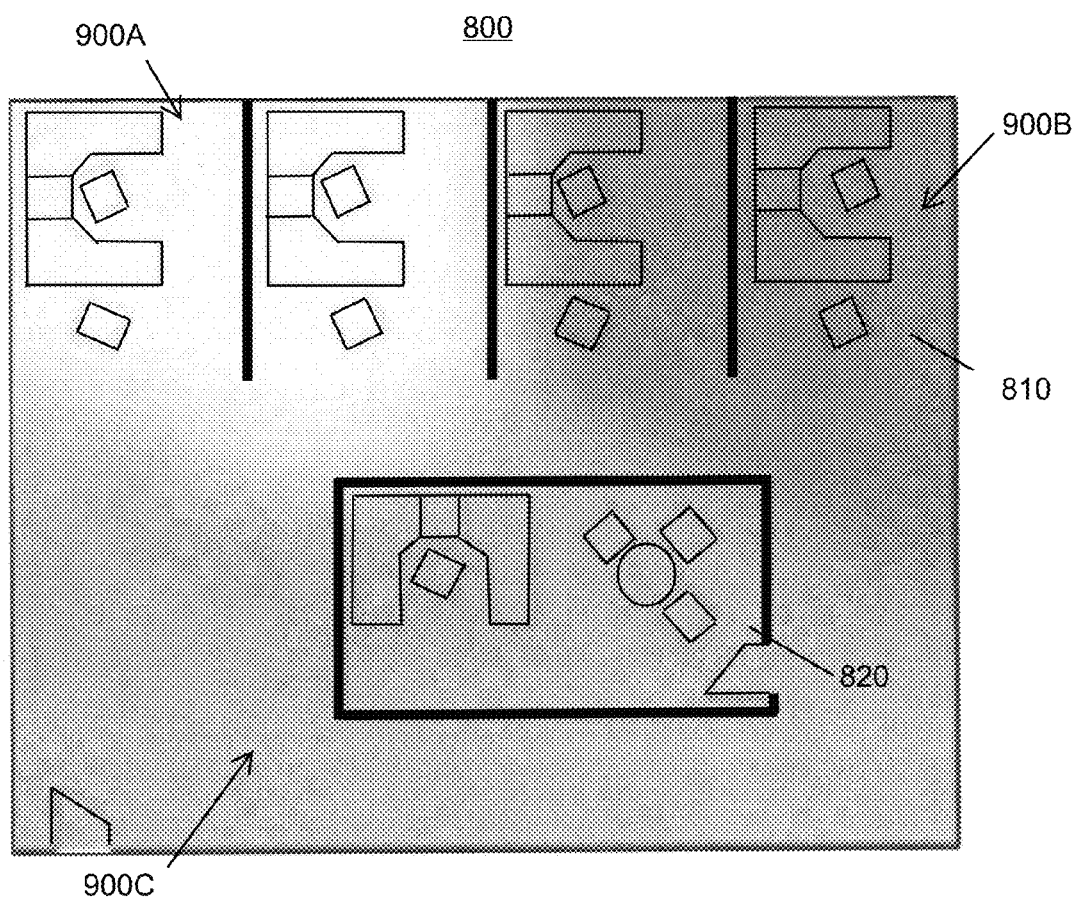

FIG. 8J illustrates each polygon including an indicator (a grayscale shading in this example). By comparison, FIG. 8K shows polygons generated and shaded without clipping the polygons based on the boundaries of the office 800. In one embodiment, the polygons in both FIGS. 8J and 8K are drawn into a reduced-scale bitmap and filled with the shading appropriate to the value of the parameter provided by the respective data sources 840, 845, 850 and 855. The reduced-scale bitmap is then stretched, creating a gradient in the indicators for the respective polygons. FIGS. 8L and 8M show the indicator gradients 900A, 900B, 900C (after stretching) for the polygons in FIGS. 8J and 8K and superimposed onto the floor plan of the office space 800 of FIG. 8A, including the open cubicle area 810 and the enclosed office 820.

Figure 9:
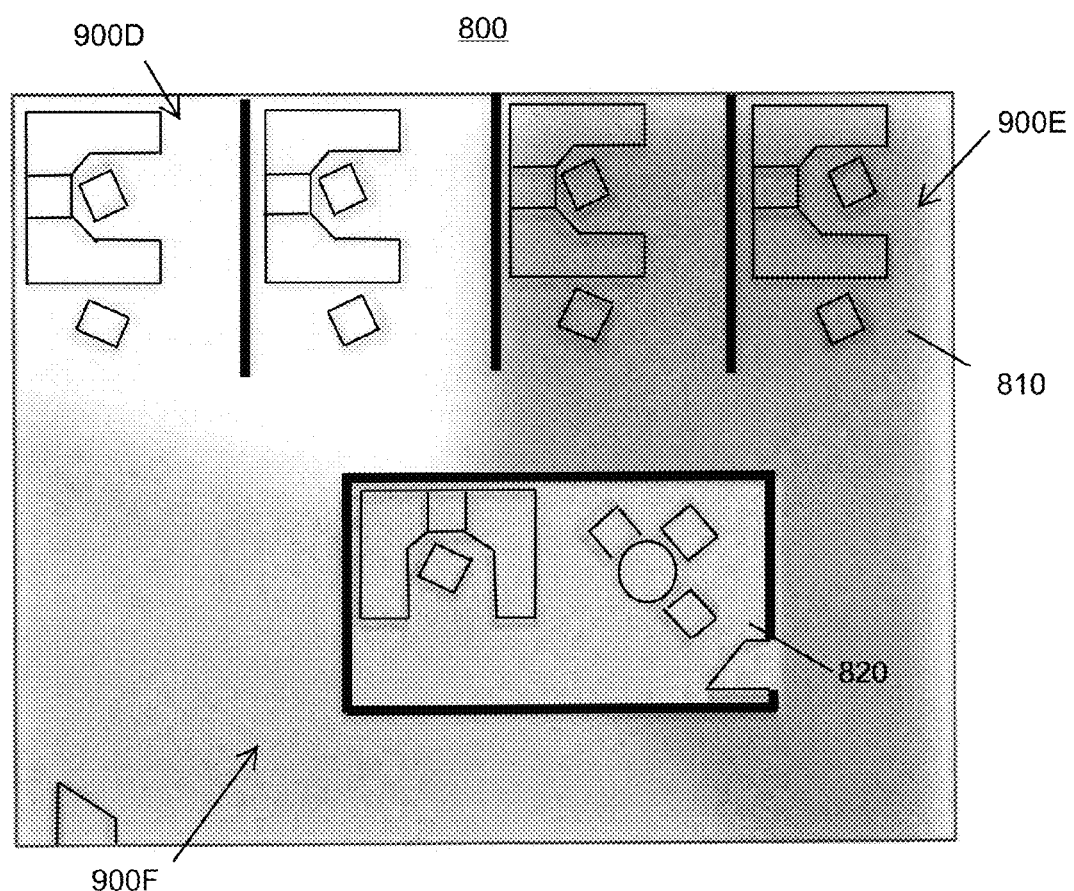
FIG. 9 illustrate the generation of alternate gradient indicators in accordance with various embodiments.

As seen in FIGS. 8L and 8M, the gradient indicators 900A, 900B, 900C blend together after stretching. The indicators 900A, 900B, 900C in FIGS. 8L and 8M also include a smooth (or gradual) gradient between the different polygons, which is a result of generating and stretching the polygons together. In another embodiment, referring now to FIG. 9, which shows indicators 900D, 900E, 900F superimposed onto the floor plan of the office space 800 of FIG. 8A, a more sharp (or abrupt) boundary between gradient indicators 900D, 900E, 900F may be generated by processing each boundary separately and, likewise, generating and stretching the polygons separately. The individually-generated and stretched polygons can then be combined in the final image (shown in FIG. 9) to form sharper boundaries between the gradient indicators 900D, 900E, 900F.

Exemplary Generation of a Color Gradient

The following description illustrates a possible method for generating a color gradient indicator, but may also be used to generate gradient indicators using patterns, shading, or any other suitable graphical indicator. In this embodiment, generation of the gradient indicator includes creating a reduced-size bitmap that is proportional to the viewable display area of the image, but of a reduced size. Objects drawn into the viewable display area are scaled to the resolution of the display screen of the user interface displaying the image, as well as to the portion of the building the user is viewing. For example, the reduced bitmap can be scaled such that 1 meter of the actual building=1 pixel in the reduced bitmap. Among other things, this allows the same scaling factor to be used for all the objects and features of the building. However, any suitable proportional size could be used (e.g., 1 meter=2 pixels).

For each data source within the viewable display area of the image, a polygon is generated for every data source, thereby defining a volume around the coordinates of the data source that is influenced by, or corresponds to, the data source. A color is selected based on the data source's value. The color can be selected by, for example, indexing the data source's value to a color map that assigns different colors across the possible value range for the parameter.

The polygon associated with the data source is drawn into the bitmap and filled with the selected color and the bitmap is stretched to an increased size in order to draw it into the display area of the image. The stretching of the bitmap creates a gradient in the color filling the polygon. For example, if the bitmap is increased in size by 50%, one pixel of the original (reduced scale) bitmap would fill an area of 1.5 pixel by 1.5 pixel. To determine the color of the half pixel, a resampling algorithm calculates a merged color value based on the surrounding pixels.

Exemplary Generation of a Color Gradient Using Intermediate Grey Scale Values

The following description illustrates another possible method for generating a color gradient indicator. In this example, a reduced-size bitmap is created as described above. For each data source, a gray scale color is computed based on the data source's value. A polygon for the data source is drawn onto the bitmap using the determined grey scale value, and the bitmap is stretched to an appropriate size.

Because the bitmap only contains grey scale values, the pixels get interpolated into other grey scale values. For example, where there is a white and a black pixel (black and white are the endmost values of the gray scale color range), interpolation between the black and white pixels during stretching yields a color with a middle gray tone. Once stretched, each pixel is converted to a color using its gray scale value. Among other things, the use of the gray scale values helps produce a smoother, more accurate transition between gradient indicators, such as the gradual change of temperature between a relatively warmer area and a relatively cooler area, particularly where the gradient indicator transitions from a first color to a second color over an intermediate third color.

The preceding two embodiments of color gradient generation produce linear transitions. The polygons associated to each data source may be further sub-tessellated, and a physically more correct model may be applied to determine the gradient indicator for each sub-polygon.

Exemplary Generation of a Color Gradient Using Finite Analysis

The preceding two methods calculate linear gradients, and thus produce only an approximation of the actual gradient. In the case where two data sources have a temperature as a value (e.g., for a thermometer), the value only describes the temperature measured at the location of the data source. The temperature in the space between the two data sources is a value that can be determined by the distance from the two data source points and their respective temperatures.

As described above, sub-tessellation can be used to improve the accuracy of the gradient indicator. Sub-tessellation can be advantageous because it can balance accuracy with performance. At some point, however, sub-tessellation creates polygons smaller than a pixel on the display of the user interface, and it would be more advantageous to calculate the gradient for each pixel rather than for polygons that are too small to be displayed in any event.

The following exemplary method calculates the value (e.g., exact value) for every pixel in the display area based on the values and location of the data sources, yielding a more accurate result over methods using linear interpolation. The method includes creating a scaled bitmap. The bitmap may be of any scale, though the most accurate values can be achieved by using a bitmap scaled to the final size need for display within the display area of the image.

The method further includes computing a color for each pixel in the bitmap by determining the data source closest to the pixel, and determining the influence of other data sources on the pixel based on the distance between the respective data sources and the pixel. The influence of a data source on a pixel may be determined in any suitable manner, such as by using a linear approximation and/or a calculation based on magnet field theory. Once the color for the pixel is determined, the pixel is drawn onto the bitmap, and the bitmap is stretched to an appropriate size (if necessary).

Exemplary System

The above-described methods may be implemented in any manner, such as through a software program operating on a computer-based system. Such a software program may be stored on any computer-readable medium, such as floppy disks, hard disks, CD-ROMs, DVDs, any type of optical or magneti-optical disks, volatile or non-volatile memory, and/or any other type of media suitable for storing electronic instructions and capable of interfacing with a computing device. Methods according to embodiments of present invention may operate in conjunction with any type of computer system, such as a personal computer (PC), server, cellular phone, personal digital assistant (PDA), portable computer (such as a laptop), embedded computing system, and/or any other type of computing device. The computer system may include any number of computing devices connected in any manner, such as through a distributed network. The computer system may communicate and/or interface with any number of users and/or other computing devices to send and receive any suitable information in any manner, such as via a local area network (LAN), cellular communication, radio, satellite transmission, a modem, the Internet, and/or the like.

Figure 10:
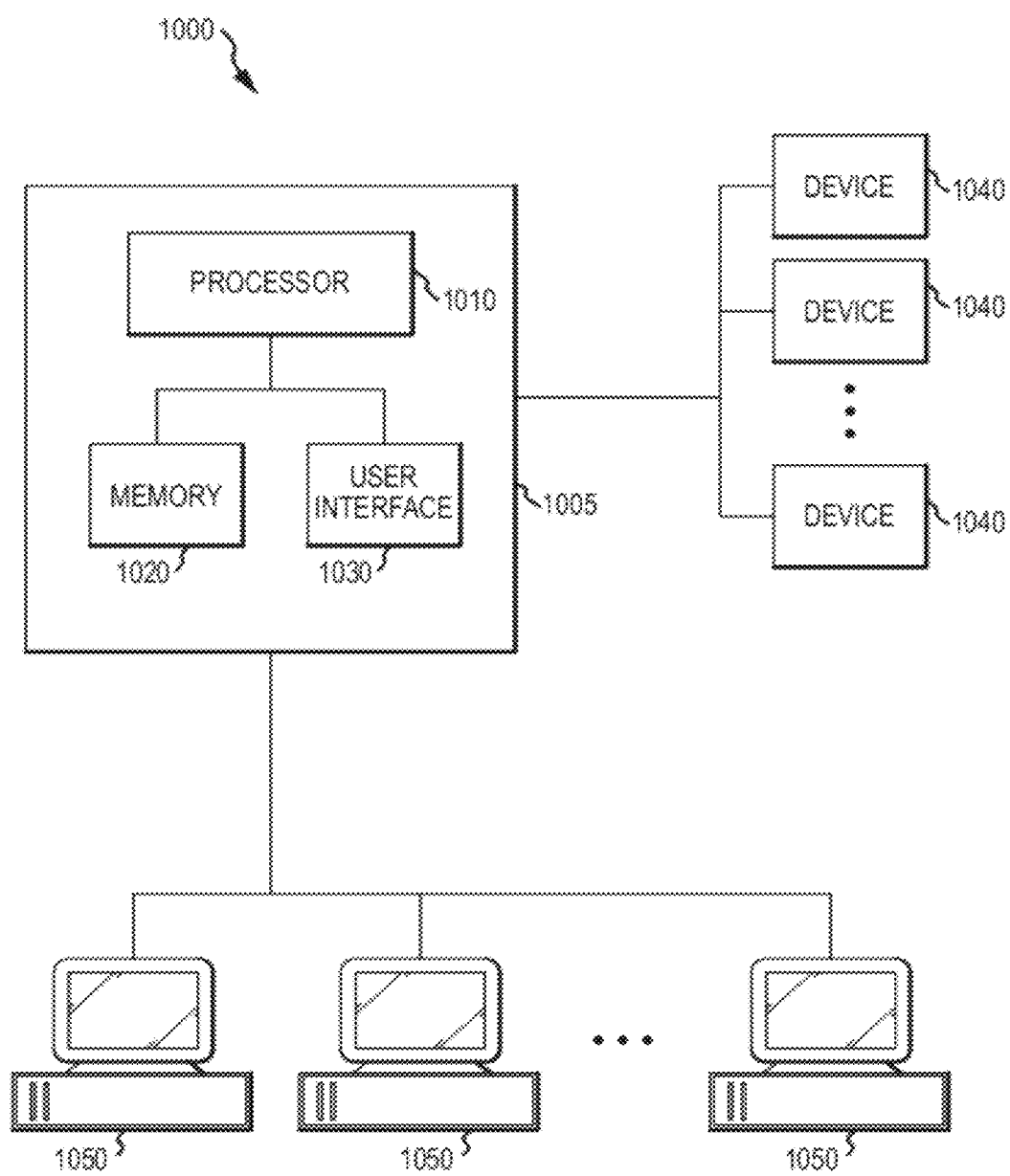
FIG. 10 illustrates an exemplary system in accordance with various embodiments.

For example, FIG. 10 depicts an embodiment of an exemplary computer-based system 1000 according to various embodiments. In this exemplary embodiment, the system includes a computer system 1005 comprising a processor 1010, memory 1020, and user interface 1030. The computer system 1005 may communicate with one or more building devices 1040, as well as with one or more additional computing devices 1050.

The computer system 1005 may store a software program configured to perform the methods described herein in the memory 1020, and run the software program using the processor 1010. The computer system 1005 may include any number of individual processors 1010 and memories 1020. Various information may be communicated between the computer system 1005 and a user via the user interface 1030. Such information may also be communicated between the computer system 1000 and other computing devices 1050 connected to the computer system 410 (e.g., through a network such as the Internet).

The computer system 1005 may display images providing building information via the user interface 1030, as well as via the user interfaces of computing devices 1050. The user interface 1030 (and user interfaces of computing devices 1050) may include various peripheral devices (such as monitors and printers), as well as any suitable control devices (such as a mouse and keyboard) to allow users to control and interact with the software program. The computer system 1005 may include any number of components, devices, and/or systems, such as a mouse, keyboard, monitor, speakers, printer, external memory device, and/or any other system or device.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Furthermore, the connecting lines shown in the various figures are intended to represent exemplary functional relationships and/or physical couplings between the various elements. Many alternative or additional functional relationships or physical connections may be present in a practical system.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

displaying, via a user interface of a computer system, an image representing at least a portion of a structure, wherein at least a portion of the image is a three-dimensional representation;

receiving a selection of a parameter for a zone of the structure, wherein the parameter describes a measurable condition of the zone;

generating a polygon based on the selected parameter, wherein the polygon includes an indicator;

expanding the polygon, wherein expanding creates a gradient in the indicator; and displaying, via the user interface, wherein the expanded polygon is a gradient indicator representing the measurable condition associated with the zone of the structure, wherein the gradient indicator is displayed with the image in accordance with the zone for the parameter.

2. The method of claim 1, wherein displaying, via the user interface, the expanded polygon comprises:

overlaying the expanded polygon on the image in accordance with the zone for the selected parameter, wherein the expanded polygon is a gradient indicator representing the measurable condition associated with the zone of the structure.

3. The method of claim 1, wherein receiving comprises:

receiving a selection of a parameter for a zone of the structure, wherein the parameter describes a lighting condition of the zone; and wherein displaying, via the user interface, the expanded polygon comprises:

displaying, via the user interface, the expanded polygon, wherein the expanded polygon is a gradient indicator representing the lighting condition associated with the zone of the structure, wherein the gradient indicator is displayed with the image in accordance with the zone for the parameter.

4. The method of claim 1, further comprising:

displaying, via the user interface, representation of a device associated with the selected parameter, wherein the representation of the device is selectable within the user interface; and adjusting a configuration of the device based on information provided by the displayed gradient indicator.

5. The method of claim 1, wherein generating a polygon comprises:

generating polygon based on the selected parameter, wherein the generated polygon is based on a boundary associated with the structure.

6. The method of claim 1, wherein generating a polygon comprises:

generating a polygon based on the selected parameter, wherein the polygon includes an indicator; and modifying at least one of a size of the polygon and a shape of the polygon to exclude a portion of the zone associated with the selected parameter.

7. The method of claim 1, further comprising:

repeating the steps of receiving, generating, and expanding to create a plurality of gradient indicators, wherein each gradient indicator in the plurality of gradient indicators is an expanded polygon representing a respective measurable condition associated with at least one respective zone of the structure; and displaying, via the user interface, the plurality of gradient indicators, wherein each gradient indicator in the plurality of gradient indicators is displayed with the image in accordance with the at least one respective zone for the parameter.

8. The method of claim 7, wherein displaying, via the user interface, a plurality of gradient indicators comprises:
blending at least two of the gradient indicators together.

9. The method of claim 7, wherein repeating comprises:
repeating the steps of receiving, generating, and expanding to create a plurality of gradient indicators, wherein at least two gradient indicators in the plurality of gradient indicators are each an expanded polygon representing a respective measurable condition associated with a single respective zone of the structure; and
wherein displaying, via the user interface, the plurality of gradient indicators comprises:
displaying, via the user interface, the plurality of gradient indicators, wherein the at least two gradient indicators in the plurality of gradient indicators are displayed with the image in accordance with the single respective zone for the parameter.

10. The method of claim 7, wherein repeating comprises:
repeating the steps of receiving, generating, and expanding to create a plurality of gradient indicators, wherein the plurality of gradient indicators is a plurality of expanded polygons representing a single measurable condition associated with at least one zone of the structure.

11. The method of claim 7, wherein displaying, via the user interface, the plurality of gradient indicators comprises:
overlaying the expanded polygons that are the plurality of gradient indicators on the image in accordance with their respective zones.

12. The method of claim 11, further comprising:
detecting that at least one expanded polygon is located in the portion of the image that is a three-dimensional representation; and
in response, transforming the at least one expanded polygon for display on the three-dimensional representation.

13. The method of claim 1, wherein displaying, via a user interface of a computer system, an image comprises:
displaying, via a user interface of a computer system, an image representing at least a portion of a structure, wherein at least a portion of the image is a three-dimensional representation, wherein the portion of the structure includes a plurality of floors of a building, and wherein representations of the plurality of floors are separated by a spacing larger than a spacing between actual floors of the building.

14. The method of claim 13, further comprising:
receiving a selection of a floor from the plurality of floors represented in the image;
animating the image in response to the selection of the floor;
displaying, via the user interface, the image at a reduced level of detail when the image is animated; and
displaying, via the user interface, the image at an increased level of detail when the image is stationary.

15. The method of claim 1, wherein displaying, via a user interface of a computer system, an image further comprises:
identifying a visible feature of the structure to display in the three-dimensional representation;
analyzing the visible feature along a z-axis of the visible feature;
identifying an invisible feature of the structure to omit from the three-dimensional representation; and
analyzing the invisible feature along a z-axis of the invisible feature.

16. The method of claim 1, wherein displaying, via a user interface of a computer system, an image further comprises:
identifying a visible feature of the structure to display in the three-dimensional representation;
identifying an invisible feature of the structure to omit from the three-dimensional representation; and
generating a three-dimensional representation of the visible features in layers, each layer corresponding to a class of features for the structure.

17. The method of claim 1, wherein displaying, via a user interface of a computer system, an image comprises:
displaying, via a user interface of a computer system, an image representing at least a portion of a structure, wherein at least a portion of the image is a three-dimensional representation, such that a boundary line in a foreground of the image is of substantially equal thickness with a boundary line in a background of the image.

18. The method of claim 1, wherein displaying, via the user interface the expanded polygon comprises:
displaying, via the user interface, the expanded polygon, wherein the expanded polygon is a gradient indicator representing the measurable condition associated with the zone of the structure, wherein the gradient indicator is displayed with the image in accordance with the zone for the parameter, such that a boundary line in a foreground of the image is of substantially equal thickness with a boundary line in a background of the image.

19. The method of claim 1, wherein displaying, via a user interface of a computer system, an image representing at least a portion of a structure comprises:
displaying, via a user interface of a computer system, an image representing at least a portion of a structure, wherein at least a portion of the image is a three-dimensional representation, and wherein the portion of the image that is the three-dimensional representation includes a vanishing point in an x-axis of the image and a vanishing point in a y-axis of the image, and does not include a vanishing point in a z-axis of the image.

20. A computer system, comprising:
a memory;
a processor;
a user interface;
a control device; and
a communication mechanism coupling the memory, the processor, the user interface, and the control device, allowing communication there between;
wherein the memory is encoded with a series of instructions that, when executed in the processor, cause the computer system to perform operations of:
displaying, via the user interface, an image representing at least a portion of a structure, wherein at least a portion of the image is a three-dimensional representation;
receiving, via the control device, a selection of a parameter for a zone of the structure, wherein the parameter describes a measurable condition of the zone;
generating a polygon based on the selected parameter, wherein the polygon includes an indicator;
expanding the polygon, wherein expanding creates a gradient in the indicator; and
displaying, via the user interface, the expanded polygon, wherein the expanded polygon is a gradient indicator representing the measurable condition associated with the zone of the structure, wherein the gradient indicator is displayed with the image in accordance with the zone for the parameter.

21. An article of manufacture including a non-transitory, tangible computer readable medium having instructions stored thereon that, in response to execution by a processor of a computer system, cause the computer system to perform operations comprising:

displaying, via a user interface of the computer system, an image representing at least a portion of a structure, wherein at least a portion of the image is a three-dimensional representation;
receiving, via the control device, a selection of a parameter for a zone of the structure, wherein the parameter describes a measurable condition of the zone;
generating a polygon based on the selected parameter, wherein the polygon includes an indicator;
expanding the polygon, wherein expanding creates a gradient in the indicator; and
displaying, via the user interface, the expanded polygon, wherein the expanded polygon is a gradient indicator representing the measurable condition associated with the zone of the structure, wherein the gradient indicator is displayed with the image in accordance with the zone for the parameter.

* * * * *